United States Patent [19]

Bourquin, deceased et al.

[11] 4,127,957

[45] Dec. 5, 1978

[54] FISHHOOK EXTRACTOR

[76] Inventors: Thomas E. Bourquin, deceased, late of Savannah, Ga., by Maggie B. Sanders, executrix, 2806 Clairborne Rd., Huntsville, Ala. 35810

[21] Appl. No.: 838,587

[22] Filed: Oct. 3, 1977

[51] Int. Cl.² ............................................. A01K 97/00
[52] U.S. Cl. ................................................... 43/53.5
[58] Field of Search ....................................... 43/53.5

[56] References Cited
U.S. PATENT DOCUMENTS

| | | | |
|---|---|---|---|
| 2,887,817 | 5/1959 | Sharpe | 43/53.5 |
| 3,603,021 | 9/1971 | Nunley | 43/53.5 |
| 4,045,904 | 9/1977 | Lore | 43/53.5 |

Primary Examiner—Robert C. Watson
Attorney, Agent, or Firm—C. A. Phillips

[57] ABSTRACT

A method and means of extracting a fishhook from a fish utilizing a shaft having a hooked end having first (30°) and second (90°) bends, the latter of which bend directs the end of the shaft back toward the shank of the extractor. The hooked end is hooked over a fishing line holding a fish and moved into the mouth of the fish and around the fishhook; and then with the extractor held in one hand and the fish line in the other hand, the fish is rotated over the fish line and thereby the fishhook released.

2 Claims, 3 Drawing Figures

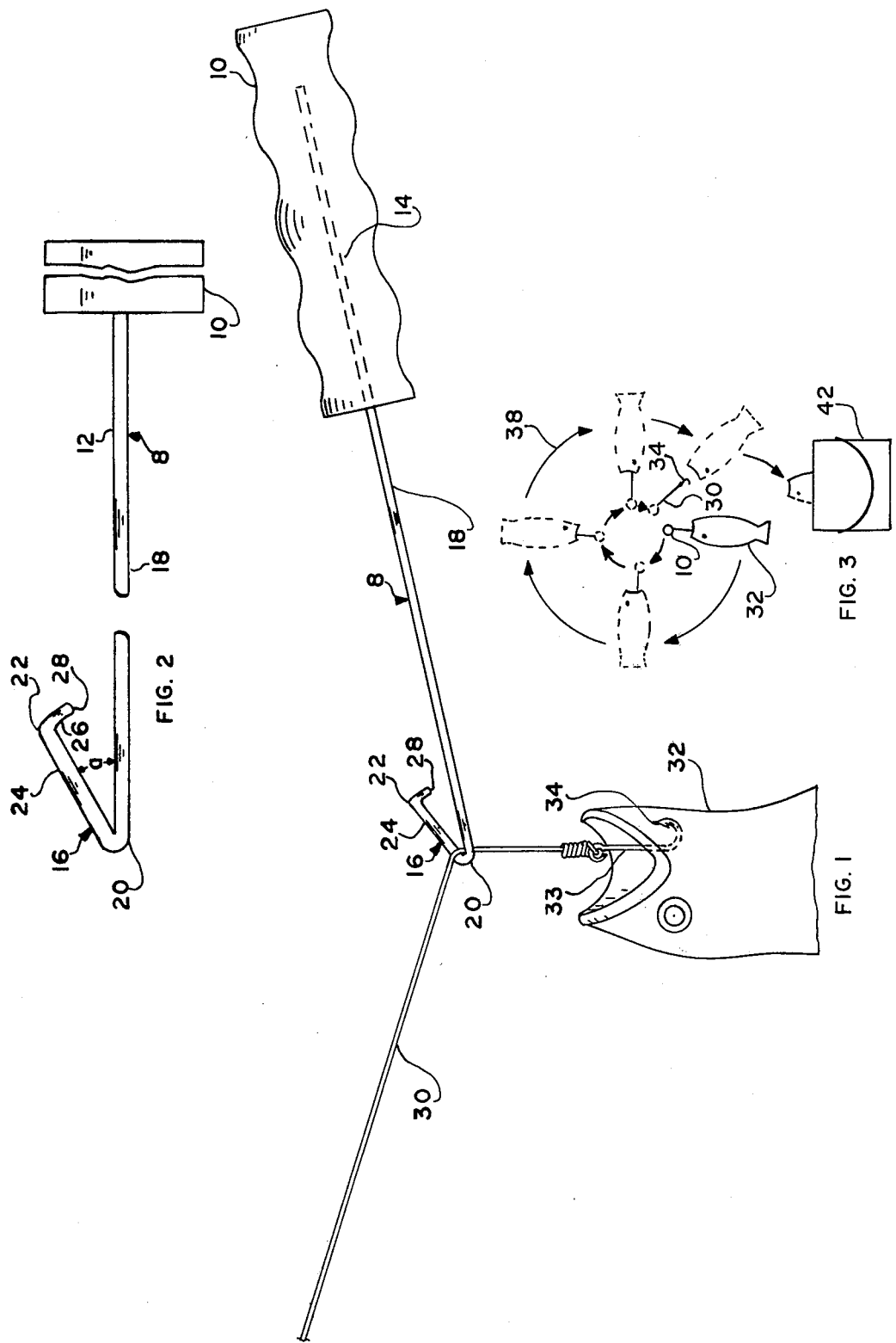

FISHHOOK EXTRACTOR

BACKGROUND OF THE INVENTION

1. Field of the Invention

This invention relates to the art of the removal of a fishhook from a fish.

2. General Description of the Prior Art

The following patents are believed illustrative of the prior art, to-wit: 1,629,583, 2,155,989, 2,176,330, 2,441,458, 2,541,331, 2,662,331, 2,724,207, 2,793,463, 3,034,252, 3,099,100, 3,397,479, 3,713,243, and 3,888,038. These patents illustrate a variety of devices for the removal of a fishhook from a fish. As far as the applicant has been able to determine, none of the patents have been successfully marketed. Certain of them have fairly complex hook arrangements which the applicant believes could create problems in effecting the release of a fishhook, and additionally, are not susceptible to simple manufacturing techniques, believed necessary to provide a marketable product. Still further, and because of their configurations, it does not appear that the patents sufficiently insure safe extraction.

SUMMARY OF THE INVENTION

In accordance with the invention, a fishhook extractor would be generally elongated in form with a handle at one end and a hook formed of a metal shaft or rod at the other end. The hook is formed by a first bent region by bending $\frac{1}{8}$ to $\frac{1}{2}$ inch of the shaft at an angle of approximately 90° and a second bent region by bending back from the first bend a distance of approximately one inch, this bend being at an angle of approximately 30°. The bends are made in essentially the same plane, and there is left an opening of approximately $\frac{1}{4}$ inch between the end of the shaft and a point on the shaft.

For extraction of a fishhook from a fish, the fishing line holding the fishhook and fish would be held in one hand and the extractor held in the other hand and the hook of the extractor moved into the mouth of the fish and around the shank of the fishhook. Then with the fish thus suspended, the operator would roll the fish up and over the hook and line, and by this action, the fish would be released from the fishhook and the first bent region, a barb, on the hook of the extractor would effectively prevent the fishhook leader or line from slipping out of the hook of the extractor and the fishhook from injuring the operator.

BRIEF DESCRIPTION OF THE DRAWINGS

FIG. 1 is a side view of an embodiment of the invention as used.

FIG. 2 is an enlarged partial side view of an embodiment of the invention.

FIG. 3 is a schematic illustration of the operation of the invention.

DETAILED DESCRIPTION OF THE DRAWINGS

Referring to the drawings, hook extractor 8 consists of a handle 10 and a metal rod or shaft 12 of $\frac{1}{8}$ to $\frac{1}{4}$ inch in thickness. One end region 14 of shaft 12 is embedded for attachment in and to handle 10. A hook 16 is formed in an opposite end region of shaft 12, this being supported by shank or intermediate shaft region 18. Hook 16 is formed by bends 20 and 22, bend 20 having a minimum angle $a$ of 25°, and at this angle hook side member 24 would be $\frac{1}{8}$ inch, and barb 26 would be formed from a bend of approximately 90°, but on a radius of 1/16 inch. It extends for a generally circular length of 3/16 inch. For these dimensions, the distance from point 28 to shank 18 would be approximately $\frac{1}{8}$ inch. Generally proportionally, the foregoing dimensions may be increased to those wherein angle $a$ is 45°, hook side member 24 is $\frac{1}{2}$ inch in length, end barb 26 is $\frac{1}{2}$ inch in length on a radius of $\frac{3}{8}$ inch, and the distance between point 28 or barb 26 and shank 18 is increased to $\frac{1}{2}$ inch.

In use, handle 10 is grasped firmly in one hand and fishing line 30 is grasped firmly in the other hand approximately one foot from fish 32. Then, hook 16 of extractor 8 is hooked over line 30 and moved down along fishing line 30 into the mouth of the fish and around shank 33 of fishhook 34. Next, line 30 and extractor 8 are drawn apart, suspending fish 32. In this posture, fishing line 30 and fishhook extractor 8 generally form a catenary, and this catenary is then swung by the operator in an arc or circular motion as shown by arrows 38 in FIG. 3, with the top portion of its travel being away from the operator. As a result, fish 32 is caused to follow a wider circular path, and near the bottom of the arc, the fish's momentum causes it to become disengaged from fishhook 33. The fish then falls in a downward direction, and desirably, into a container 42 which would be positioned below the operation. Fishing line 30 is kept witin hook 16 by barb 26, thus keeping the fishhook from causing injury to the operator.

Having thus disclosed my invention, what is claimed is:

1. The method of removing a fish from a fishhook by an extractor wherein:

the extractor comprises:
 a handle,
 a rod of $\frac{1}{8}$ to $\frac{1}{4}$ inch in thickness having a straight portion extending from said handle and a hook-shaped end region generally lying in a plane with said straight portion, said hook-shaped end region formed by first and second spaced bends in said rod and wherein:
 said first bend forming said straight portion an acute angle, and said second bend spaced along said rod $\frac{1}{2}$ to 1 $\frac{1}{2}$ inches from said first bend, and said second bend turning at an angle of approximately 90° in the same direction as said first bend, and
 an extreme end region of said rod extending from said second bend toward and within $\frac{1}{8}$ to $\frac{1}{4}$ inch of said straight portion of said rod, and the inward side of the hook — shaped region provided by said extreme end region of said rod being turned slightly inward, at least at its end, whereby a fishing line under tension are sliding against the inner side of the rod between bends would be blocked from exit from the hook — shaped region, but a loose line may be freely removed from said hook — shaped region,
by the steps comprising:
 grasping said handle in one hand and said fishing line in the other hand and moving said hook — shaped region into the mouth of the fish and around the fishhook and moving the hands apart, causing the fish to be suspended by the fishing line and extractor, and
 then moving the hands in generally parallel planes in a circular motion about a generally horizontal axis, said circular motion being in a direction, whereby the hook member is rotated upward, inside, between said axis and the body of the operator, over said axis, and downward on the outside of the axis, whereby a hooked fish is rotated in the same direction of rotation, and when near the bottom of the arc of rotation, the fishhook and fish separate by virtue of the described motion and weight of the fish.

2. A fishhook extractor comprising:

a handle;

a rod having a straight portion extending from said handle and a hook-shaped end region generally lying in a plane with said straight portion, said hook-shaped end region formed by first and second spaced bends in said rod, and wherein:

said first bend forming said straight portion an acute angle of 25° to 45°, and said second bend spaced along said rod $\frac{1}{2}$ to $1\frac{1}{2}$ inches from said first bend, and said second bend turning at an angle of approximately 90° in the same direction as said first bend, and an extreme end region of said rod extending from said second bend toward and within $\frac{1}{8}$ to $\frac{1}{4}$ inch of said straight portion of said rod, and the inward side of the hook-shaped region provided by said extreme end region of said rod being curved inward on a radius of $\frac{1}{16}$ to $\frac{3}{8}$ inch, whereby a fishing line under tension and sliding against the inner side of the rod between bends would be blocked from exit from the hook-shaped region, but a loose line may be freely removed from said hook-shaped region.

* * * * *